United States Patent [19]

Blau

[11] 4,108,042
[45] Aug. 22, 1978

[54] MUSIC TEACHING MACHINE

[76] Inventor: Harry Blau, 1431 Ocean Ave., Apt. 1412, Santa Monica, Calif. 90401

[21] Appl. No.: 803,441

[22] Filed: Jun. 6, 1977

[51] Int. Cl.² ............................................. G09B 15/02
[52] U.S. Cl. ................................................. 84/471 R
[58] Field of Search ........... 84/471, 473, 474, 485 SR; 235/83, 84, 85 R, 88 R–88 RC

[56] References Cited

U.S. PATENT DOCUMENTS

| | | | |
|---|---|---|---|
| 1,780,918 | 11/1930 | Holzman | 84/471 |
| 3,027,073 | 3/1962 | Handelman | 235/83 |
| 3,129,628 | 4/1964 | Hall | 84/471 |

Primary Examiner—L. T. Hix
Assistant Examiner—Stafford D. Schreyer
Attorney, Agent, or Firm—Spensley, Horn & Lubitz

[57] ABSTRACT

A music teaching machine comprising a rotatable disc sandwiched between two panels. Each of the panels is provided with a cut out through which information provided on both sides of the disc is displayed, information and instructions and finger rests. The bottom of the panel is provided with a strip extension and metal pointer used to point out notes on a piano keyboard provided on panels.

8 Claims, 6 Drawing Figures

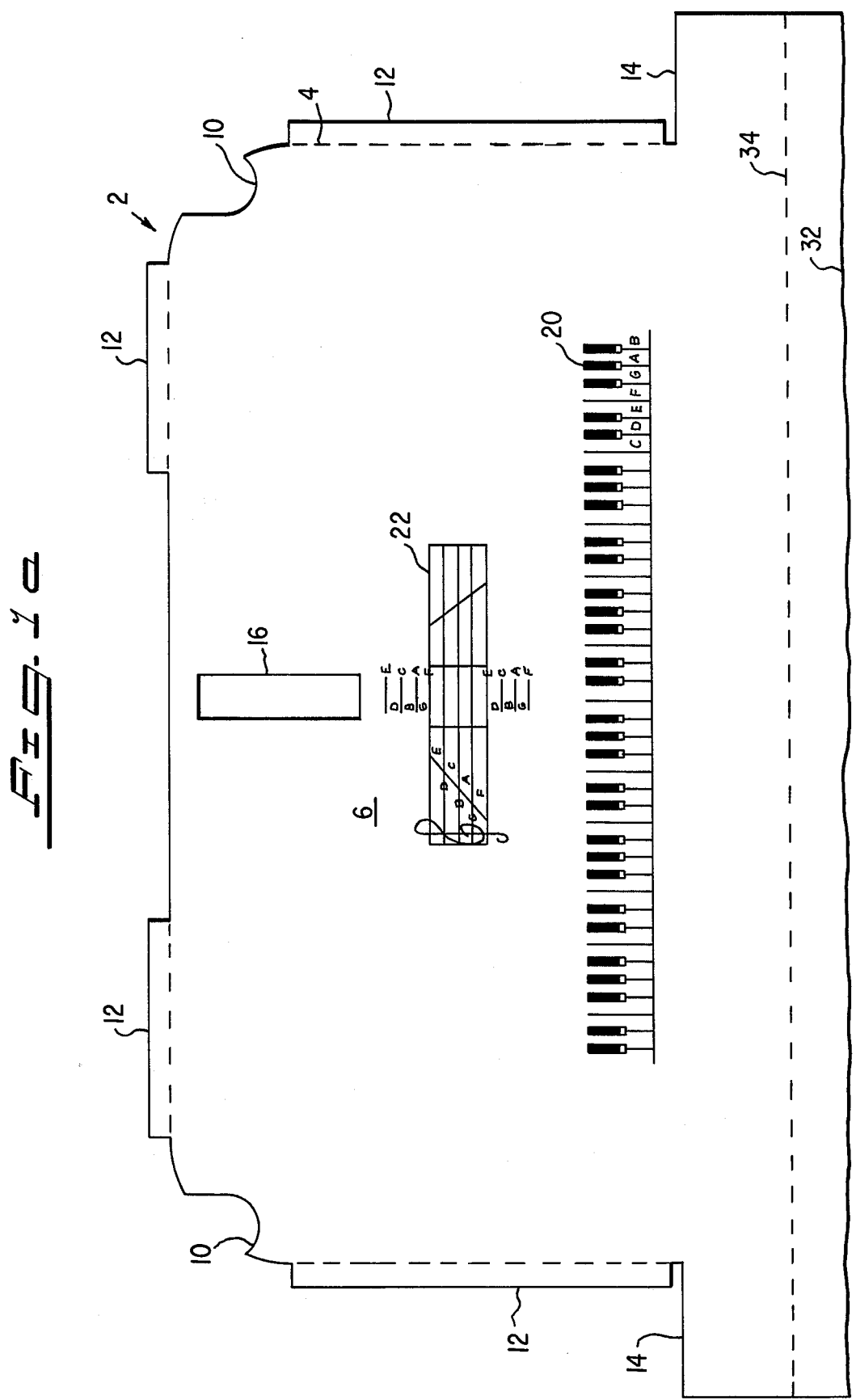

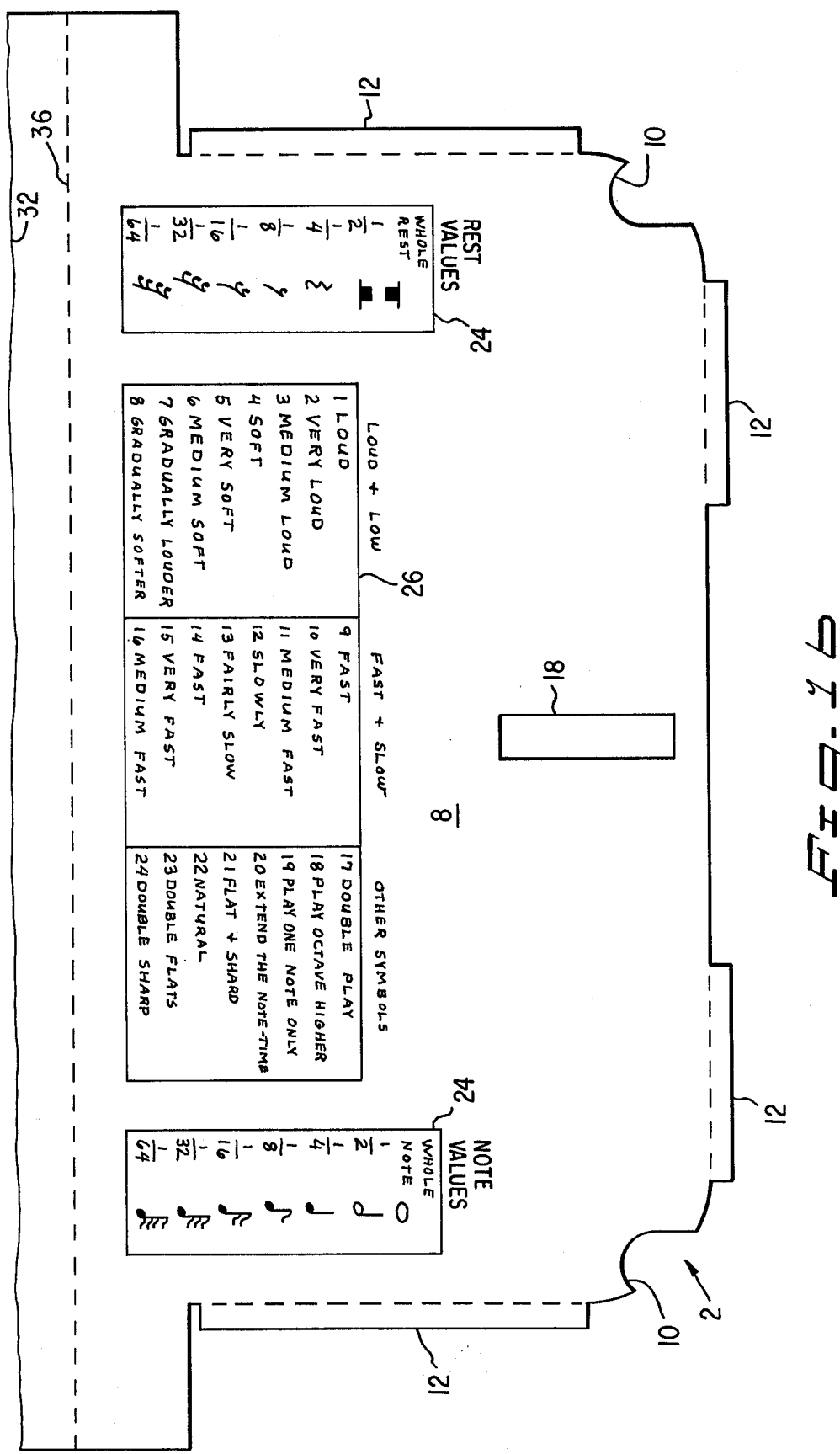

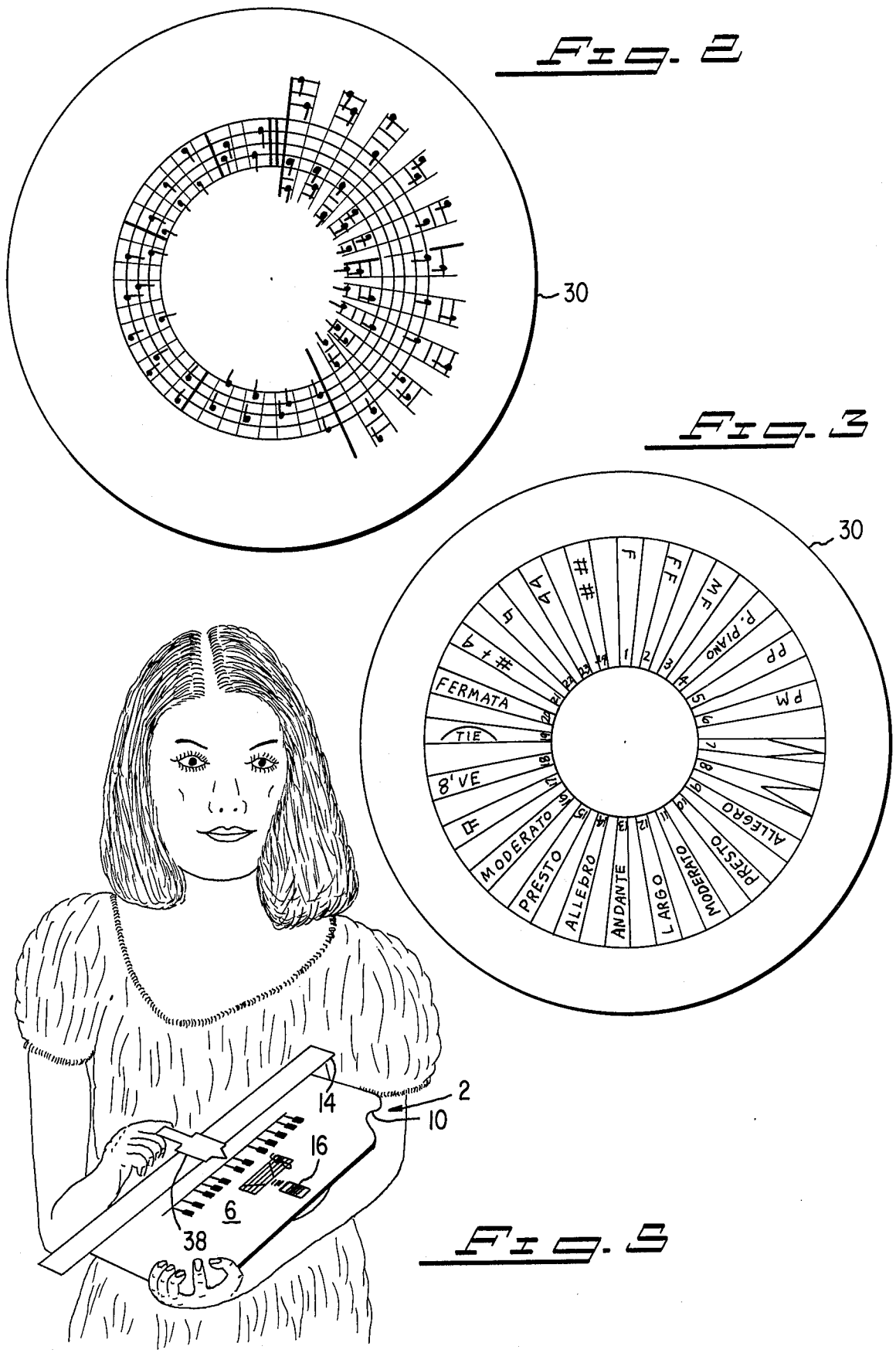

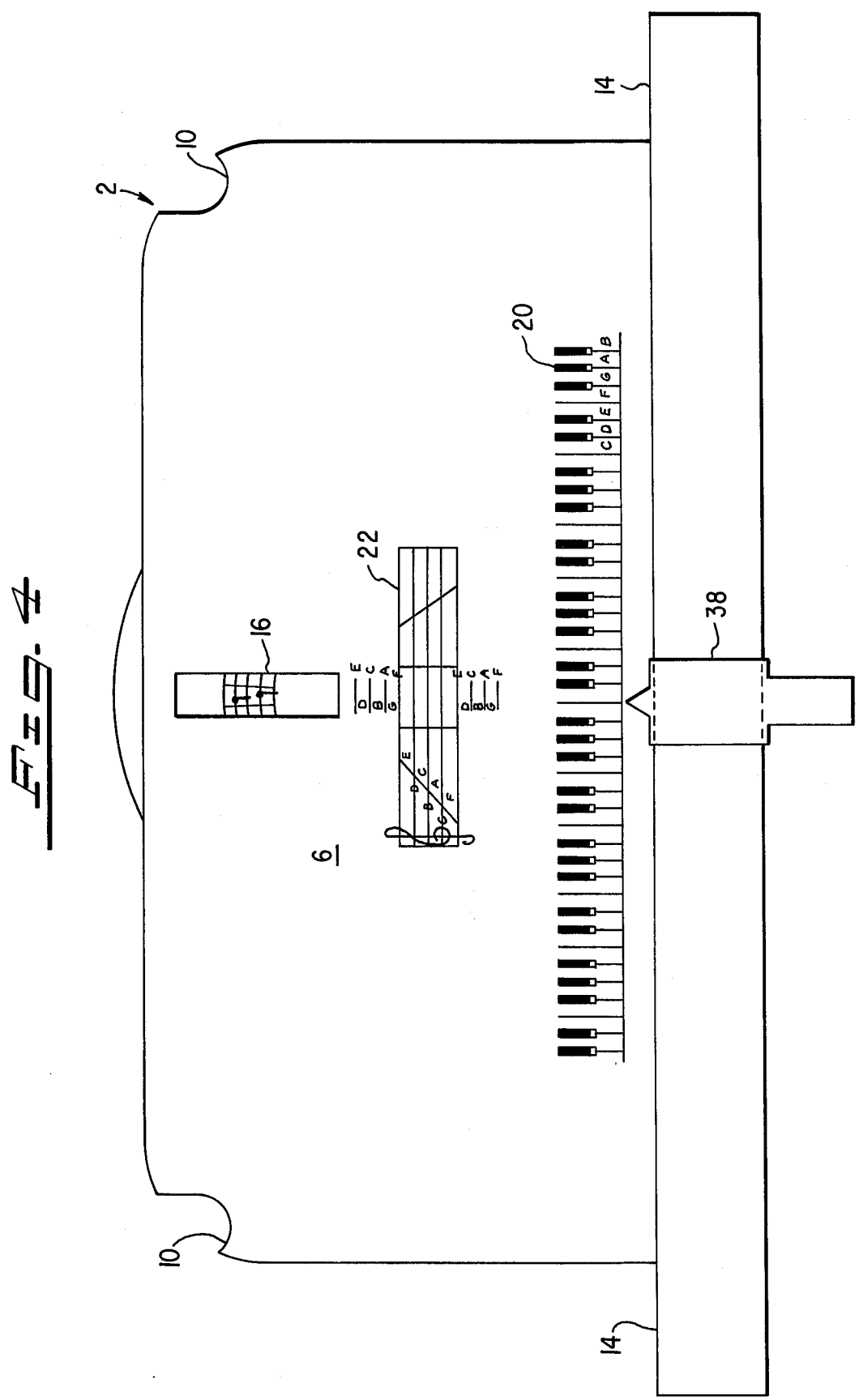

_(4,108,042)_

MUSIC TEACHING MACHINE

FIELD OF INVENTION

This invention relates to the teaching of music and more particularly to mechanical devices for teaching music.

DESCRIPTION OF THE PRIOR ART

In the prior art exist many types of mechanical devices for teaching music. One such device includes a note finder such as is shown in U.S. Pat. No. 2,941,436 granted to Ericksen on June 21, 1960. This device consist of a card having a window therethrough and having the names of the notes provided along one edge of the window. The card is designed to be placed onto a sheet of music so that the user can determine the name of the notes one at a time. Clearly such a device teaches very little to the user. In an attempt to teach more to the user, teaching apparatuses such as disclosed in U.S. Pat. No. 954,436 issued to Effie M. Hunter on Apr. 12, 1910 were developed. Such devices include a disc sandwiched between two circular panels having a plurality of cut out formed therein to display several different types of information which appears on the disc. Such a device while being useful at teaching music is very complex and would not necessarily be useful for beginners. In addition, such a device contains nothing for the student to do and is essentially a passive device. Therefore the instruction of the student is not reinforced by having the student perform some act. In addition, such devices typically are not provided with any convenient method for holding the device and therefore is inconvenient to utilize.

Accordingly, it is a general objective of the present invention to provide a music teaching machine which teaches music.

It is another object of the present invention to provide a music teaching machine which is useful for beginners.

It is yet another object of the present invention to provide a music teaching machine which provides the student with an active role.

It is still another object of the present invention to provide a music teaching machine which is convenient to hold and utilize.

SUMMARY OF THE INVENTION

In keeping with the principles of the present invention, the objectives are accomplished by a unique music teaching machine including a rotatable disc sandwiched between two panels. Each of the panels is provided with cutout for displaying information contained on both sides of the disc, information and instructions and finger rests on both sides of the top edge of the panels. The bottom of the panels is provided with an extension and metal pointer which is used to point out notes on a piano keyboard provided on one of the panels.

To utilize the music teaching machine of the present invention, the extended end of the music teaching machine finger rest to hold the end of the strip extension against the chest of the student. The student's thumb is used to rotate the disc and the sliding metal pointer is utilized to point out the keys on the keyboard as the student reads the notes displayed through the cut out in the panel.

BRIEF DESCRIPTION OF THE DRAWINGS

The above mentioned the features and objects of the present invention will become more apparent by reference to the following description taken in conjunction with the drawings, wherein like reference numerals denote like elements, and in which:

FIGS. 1A and 1B is a plan view of a foldable panel for a music teaching machine in accordance with the teachings of the present invention;

FIG. 2 is a front planned view of a disc utilized in the music teaching machine in accordance with the teachings of the present invention;

FIG. 3 is a rear planned view of the disc utilized in the music teaching in accordance with the teachings of the present invention;

FIG. 4 is a front view of a music teaching machine in accordance with the teachings of the present invention; and FIG. 5 is a perspective view illustrating the music teaching machine in accordance with the teachings of the present invention being utilized by a student.

DETAILED DESCRIPTION OF THE INVENTION

Referring to FIGS. 1A and 1B is a plan view of a foldable panel for a music teaching machine in accordance with the teachings of the present invention. The music teaching machine 2 consist of a foldable panel 4 of generally rectangular shape and having a folded front side 6 and a folded rear side 8. The panel 4 is further provided with a notch 10 in each of the four corners of the panel 4. The notch 10 is utilized as a finger rest when the music teaching machine is being utilized by a student. In addition, the panel 4 is provided with flaps 12 about its edge. At the center of both sides of panel 4 is provided a strip extension 14 which extends outwardly from the generally rectangular shaped panel 4.

A cut out 16 is provided in the folded front side 6 and cut out 18 is provided in the folded rear side 8. The folded front side 6 is further provided with a keyboard 20 adjacent the center of the panel 4 and extending generally across the panel 4. Furthermore, the folded front side 6 is provided with a scale 22 which assists the student to learn to read music.

The rear folded side 8 is provided with tables 24 and 26. The table 24 illustrates the symbols for the lengths of a note and the length of a rest. Table 26 illustrates information such as the meaning of the Italian terms describing the speed or the volume that the music is to be played.

Referring to FIGS. 2 and 3, shown therein is a front planned view and a rear planned view of a disc utilized with the music teaching machine in accordance with the teachings of the present invention. As shown in FIG. 2 the front side of the disc is provided with notes arranged on a circular musical scale about the center of the disc 30. The notes and the circular scale are so arranged and configured such that when incorporated into the musical teaching machine the notes can be selectively displayed through the cut out 16.

As shown in FIG. 3, the rear side of the disc 30 is provided with information such as the terms which indicate the speed and volume with which the music is played. In this present embodiment, the rear side of the disc 30 is divided up into 24 sections. Each of the sections is numbered and the numbers can be selected such that they correspond to numbers in either table 26 or table 24. In this presently described embodiment, the numbers correspond to numbers in table 26.

Referring to FIGS. 1, 2, 3 and 4, to assemble the music teaching machine 2, first the flaps 12 are bent such that they touch the underside surface of the panel 4. Next, the panel 4 is folded in half along the phamtom line 32. Then the panel 4 is folded along the phantom lines 34 and 36 such that the backsides of the folded front side 6 and the folded rear side 8 touch and the portion of the panel 4 between phantom line 34 and phantom line 36 in contained between the front folded side 6 and the folded rear side 8. Accordingly, the panel 4 is double folded adjacent the strip extension 14. The disc 30 is then rotatable coupled to at least either the folded front side 6 or the folded rear side 8 such that the front side of the disc 30 displays the notes through the cut out 16 and the rear side of the disc 30 displays information through the cut out 18 is shown in FIG. 4.

Then the folded front side 6 and the folded rear side 8 are coupled together by any suitable means such as an adhesive or a fastener. A slideable pointer 38 is slideably coupled along the bottom edge of the folded front side 6 such that the pointer can be slideably moved from one key to another key of the keyboard 20 provided on the folded front side 6 as shown in FIG. 4.

As shown in FIG. 5 and also referring to FIGS. 4 and 1, in operation a right handed student would grasp the music teaching machine and place his index finger in the finger rest notch 10 and extend his thumb back towards the disc 30. The student would then press one end of the strip extension 14 against his chest, as shown in FIG. 5, and hold it there with pressure applied to the finger rest notch 10. The student then could turn the disc using his thumb of left hand and move the pointer 38 with his right hand. By holding the music teaching machine 2 in this manner the music teaching machine is held at a good viewing proximity for reading the instructions contained on the music teaching machine 2 and allows the student to view the information displayed to the student and move the pointer 38 with his other hand. In this way coordination of the eyes and hand movements of the student is developed.

From the foregoing description, it should be apparent that the single unit construction of the panel 4 for the music teaching machine together with the double folded strip extension 14 and the folded over flanges 12 results in an inexpensive structure which provides needed rigidity and simultaneously creates a spacer between the folded front sides 6 and the folded rear side 8 so that the disc 30 can be easily rotated.

It should be apparent to one skilled in the art that the panel 4 can be made from any foldable material such as cardboard and that the panel 4 could be divided into two pieces without departing from the spirit and scope of the invention. In addition, the disc 30 could be made interchangeable and other music information could be displayed to the student on an interchangeable basis and the tables on the panels could contain a variety of musical data.

In all cases, it is understood that the above described embodiments are merely illustrative of but a few of the many possible specific embodiments which represent the application and principles of the present invention. Numerous and other arrangements could be readily devised by those skilled in the art without departing from the spirit and scope of the invention.

I claim:

1. A music teaching machine comprising a rotatable disc having predetermined information thereon sandwiched between a first and second panels, each of said panels being provided with a cut out for selectively displaying said information on said disc, a piano keyboard printed on said first panel, a pointer slidably coupled to said first panel for pointing out keys of said piano keyboard, at least one finger rest provided in said first and second panel, and a strip extension provided on and extending from said first and second panels whereby said strip extension is pressed into the chest of an operator by a finger of said operator engaged with said finger rest.

2. A music teaching machine according to claim 1 wherein a portion of said disc extends beyond one edge of said first and second panels for manual rotation thereof.

3. A music teaching machine according to claim 1 wherein at least one table for use with information on said disc is provided on said second panel.

4. A music teaching machine according to claim 1 wherein said first and second panels comprise a single third panel folded substantially in half adjacent said strip extension.

5. A music teaching machine according to claim 4 wherein said strip extension is made stiffer by double folding said third panel.

6. A music teaching machine comprising a rotatable disc having predetermined information thereon sandwiched between a first and second panel having a cut out provided therein for selectively displaying said information on said discs, said improvement comprising:
a piano keyboard printed on said first panel;
a pointer slidable coupled to said first panel for pointing out keys in response to information displayed in said cut out in said first panel;
at least one finger rest provided in said first and second panel; and
a strip extension provided along an edge of said first and second panels adjacent said pointer and extending from said first and second panels whereby said strip extension is pressed into a chest of an operator by a finger of said operator engaged with said finger rest and said music teaching machine is comfortably supported such that said operator can easily read the information displayed and can easily operate said pointer.

7. A music teaching machine according to claim 6 wherein a portion of said disc extends beyond one edge of said first and second panels for manual rotation thereof.

8. A music teaching machine according to claim 6 wherein at least one table for use with information on said disc is provided on said second panel.

* * * * *